Jan. 16, 1951     A. BOUWERS     2,538,291
LENS SYSTEM
Filed Jan. 3, 1946
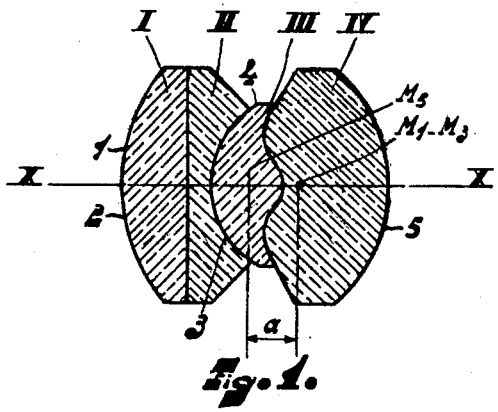
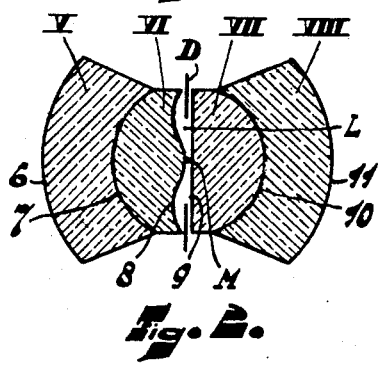
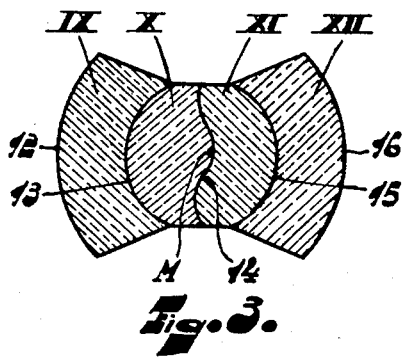
INVENTOR
ALBERT BOUWERS
BY
ATTORNEY Patented Jan. 16, 1951

2,538,291

UNITED STATES PATENT OFFICE 2,538,291

LENS SYSTEM

Albert Bouwers, Delft, Netherlands, assignor to N. V. Optische Industrie "De Oude Delft," Delft, Netherlands Application January 3, 1946, Serial No. 638,769
In the Netherlands October 29, 1942

Section 1, Public Law 690, August 8, 1946
Patent expires October 29, 1962

14 Claims. (Cl. 88—57)

This invention relates to a lens system comprising at least three strongly curved spherical surfaces, not all of which are curved in the same sense, whose centers of curvature are not more remote from one another than ¼ of the focal distance of this lens system, and further comprising at least one aspherical surface cutting the optical axis of the system at a distance from one of these centers of curvature, which corresponds to at most ¼ of the focal distance of the system.

By placing, in the lens system according to the invention, the centers of curvature of the strongly curved spherical surfaces in the indicated manner in the vicinity of one another, one obtains the advantage that this system has a comparatively large field. By utilizing at least one aspherical surface at the indicated place in the lens system, this comparatively large field of the system is retained with a high optical strength of the lens system and a good correction thereof. The term "strongly curved" spherical surface has to be understood in this connection to mean a spherical surface whose radius of curvature is at most equal to the focal distance of the system. Constructing the lens system in accordance with the invention permits of obtaining with an aperture ratio 1:1 a field of 18° to 20°, which is more than sufficient for cinema projection.

If with the same aperture ratio a larger field, for example of the order of magnitude of 30°, is desired, this may be obtained in one advantageous form of construction of the lens system according to the invention by causing the centers of curvature of at least three, preferably of all the strongly curved spherical surfaces of the system to coincide completely or almost completely.

Very advantageous results are then obtained if according to another embodiment of the invention the lens system is made such as to comprise in total four strongly curved spherical surfaces, completely or almost completely concentrical, two of which are located at one side and the other two at the other side of the common center of curvature of these surfaces, and further an air-cavity in or in the vicinity of the said common center of curvature, which air-cavity is bounded by two surfaces having no curvature or a slight curvature, one of which at least is aspherical. This system offers the advantage of a very large aperture ratio (1:1) and a very large field (about 35°), while it exhibits, in addition, only four surfaces making contact with the air, which reduces the losses due to reflection in the system.

When an exceptionally high sharpness of the image projected by the lens system is required, it is desirable, according to one advantageous embodiment of the invention desirable that the said air cavity in the lens system should be limited by a plane surface and a surface of which the meridional section is a curve of the fourth degree.

In view of the correction in the case of projection by skew beams it is preferable, according to another form of construction of the lens system according to the invention, that the diaphragm existing in this system be arranged in the said air cavity.

Another form of construction of a lens system according to the invention comprises in total four strongly curved spherical surfaces, completely or almost completely concentrical, and further an aspherical surface cutting the optical axis in or in the vicinity of the common center of curvature of the strongly curved spherical surfaces, while the refractive indexes of the two media separated by the aspherical surface are larger than that of the air and preferably differ by less than 0.3. The advantage of this lens system resides in the fact that, if no air cavity exists, only two boundary surfaces of the system contact with the air, so that the losses due to reflection become minimum. The indicated choice of the difference between the refractive indexes of the two media separated by the aspherical surface results in the additional advantage that whilst retaining satisfactory optical results the shaping of the aspherical surface may be effected with less accuracy than if the difference between the refractive indexes were larger.

The invention will be explained more fully with reference to the accompanying drawing showing, by way of example, several forms of construction of the lens system according to the invention.

In the drawing,

Fig. 1 is a cross-sectional view of one embodiment of the invention in which the centers of curvature of the spherical refractive surfaces are within one-fourth the focal distance of the system from each other, and an aspherical refractive surface lies between said centers;

Fig. 2 is a cross-sectional view of another embodiment wherein the centers of curvature of the spherical refractive surfaces are coincident, and there is an air space in the vicinity of said centers with an aspherical refractive surface facing the air gap; and Fig. 3 is a cross-sectional view of a third embodiment of the invention wherein the centers of curvature of the spherical surfaces are coincident and an aspherical refractive surface passes substantially through said centers of curvature.

Thus, Figure 1 shows a lens system constituted by four elements I, II, III and IV. The focal distance of this system amounts to 100 mms. The surfaces 1, 3 and 5 of this system are spherical and strongly curved, i. e. the radius of curvature of each of these surfaces is at most equal to the focal distance of the system. The centers of curvature of the surfaces 1 and 3 coincide in point $M_1M_3$, whereas the center of curvature of the surface 5 is located in $M_5$. The distance between point $M_1M_3$ on the one hand and $M_5$ on the other hand, which distance is indicated by $a$ in Figure 1, amounts to 20 mms. The surface 4 is aspherical and cuts the optical axis of X—X in point P which is located between $M_1M_3$ and $M_5$. Due to the aspherical form of the surface 4, one obtains an aperture ratio 1:1 with a field of 19°. Since the refractive indexes of the media of elements I and II differ but slightly for the average wavelength of the light used, the cemented surface 2, which is plane and is available for the purpose of obtaining a satisfactory correction of colour of the system, will not affect the possibility of obtaining satisfactory images with this system even with skew beams. The refractive indexes of the media of elements II and III also differ but slightly, viz. by 0.08.

The further form of construction of the optical system according to the invention which is shown in Figure 2 is constituted by four elements V, VI, VII, VIII, and air-cavity L existing between the elements VI and VII. The surfaces 6, 7, 10 and 11 are spherical and all of them have their centers of curvature in M. The radii of curvature of these surfaces are chosen such as to be smaller than the focal distance of the system, being 100 mms. The air-cavity L, which has a diaphragm D, arranged in it, is bounded on the one hand by an aspherical surface 8, whose meridional section is a curve of the fourth degree and, on the other hand, by a plane surface 9. Due to the fact that all the spherical surfaces are concentric the field may here acquire a value of 35°. As before, the aperture ratio of the system amounts to 1:1. The difference between the refractive indexes at the two cemented surfaces 7 and 10 is but small and is in this case only 0.04 for the average wavelength.

With regard to the constructional example of the lens system according to the invention which is shown in Figure 3 it may be mentioned that this system comprises four elements, viz. IX, X, XI and XII. The spherical surfaces 12, 13, 15 and 16 are strongly curved in the sense of the invention and have a common center of curvature in M. The elements X and XI have a common aspherical bounding surface 14. Since the difference between the refractive indexes of the media of the elements X and XI is smaller than 0.1, the adjacent aspherical surfaces of the elements X and XI may be finished with comparative inaccuracy without image faults being involved. The differences between the refractive indexes at the places of the cemented surfaces 13 and 15 of the media there adjoining each other are equal to 0.06. The aperture ratio of this system is 1:1 and the value of the field 35°. This system is also particularly suitable for photographic purposes, though it is evident that it lends itself also to image projection.

When no special auxiliary means are provided, this lens system always involves curvature of image, so that the projection screen or the film image to be projected must be curved in conformity with the curvature of image of the system. In either case it is desirable that the film should be arranged on a spherical carrier which is made of a transparent material, so that the rays passing from the objective to the image surface and from the image surface to the objective respectively can pass the image carrier.

What I claim is:

1. An approximately concentric lens system having an optical axis and comprising a plurality of lens elements having three strongly curved spherical refractive surfaces one of which is curved in a sense opposite to that of the other two, said spherical surfaces having their centers of curvature positioned on said optical axis within a distance with respect to each other less than about one-fourth of the focal distance of the lens system, one of said elements having an aspherical refractive surface intersecting said optical axis at a distance from said centers of curvature less than about one-fourth of the focal distance of the lens system.

2. An approximately concentric lens system having an optical axis and comprising a plurality of lens elements having three strongly curved spherical refractive surfaces one of which is curved in a sense opposite to that of the other two, said spherical surfaces having their centers of curvature at points on said optical axis, one said element having an aspherical refractive surface, said surface having a meridional section which is a curve of the fourth degree intersecting said axis at a point, all the said points being positioned within a distance on said optical axis less than about one-fourth the focal distance of said system.

3. An approximately concentric lens system having an optical axis and comprising a plurality of lens elements having three strongly curved spherical refractive surfaces one of which is curved in a sense opposite to that of the other two, said surfaces having substantially coincident centers of curvature on the said axis, one said lens having an aspherical refractive surface intersecting said optical axis substantially at said centers of curvature.

4. A lens system having an optical axis and comprising a plurality of lens elements having four strongly curved spherical refractive surfaces having centers of curvature substantially coincident at a point on said axis, two of said surfaces being positioned on one side and two of said surfaces being positioned on the other side of said point, one of said elements having an aspherical refractive surface intersecting said optical axis at a distance from said point less than about one-fourth of the focal distance of the lens system, another of said elements having a substantially plane refractive surface normal to said axis and intersecting said axis at a distance from said point less than about one-fourth of the focal distance of the system, the said aspherical surface and the said substantially plane surface being separated by air.

5. A lens system having an optical axis and comprising a plurality of lens elements having four strongly curved spherical refractive surfaces, having centers of curvature substantially coincident at a point on said axis, two of said surfaces being positioned on one side and two of said surfaces being positioned on the other side of said point, one of said lens elements having an aspherical refractive surface having a meridional section of the fourth degree, and another of said lens elements having a substantially plane refractive surface normal to said axis, said aspherical surface and said plane surface being separated by air and intersecting said optical axis within a distance from said point less than about one-fourth the focal distance of the lens system.

6. A lens system having an optical axis and comprising a plurality of lens elements having four strongly curved spherical refractive surfaces having centers of curvature substantially coincident at a point on said axis, two of said surfaces being positioned on one side and two of said surfaces being positioned on the other side of said point, one of said lens elements having an aspherical refractive surface, another of said lens elements having a substantially plane refractive surface substantially normal to said axis, said aspherical surface and said plane surface being separated by air and intersecting said optical axis within a distance from said point less than about one-fourth the focal distance of the lens system.

7. A lens system having an optical axis and comprising a plurality of lens elements having four strongly curved spherical refractive surfaces having centers of curvature substantially coincident at a point on said axis, two of said surfaces being positioned on one side and two of said surfaces being positioned on the other side of said point, one of said lens elements having an aspherical refractive surface, another of said lens elements having a substantially plane refractive surface substantially normal to said axis, said aspherical surface and said plane surface being separated by air and intersecting said optical axis within a distance from said point less than about one-fourth the focal distance of the lens system, and a diaphragm positioned between said plane and said aspherical surface.

8. A lens system having an optical axis and comprising a plurality of lens elements having four strongly curved spherical refractive surfaces having their centers of curvature substantially coincident at a point on said axis, two of said surfaces being positioned on one side and two of said surfaces on the other side of said point, one of said lens having an aspherical refractive surface intersecting said optical axis substantially at said point, another of said lens elements having a surface complementary to said aspherical surface and cemented thereto, the indexes of refraction of said one lens element and said other lens element differing by less than about 0.3.

9. A substantially spherically symmetrical lens system which comprises a pair of dispersive meniscus elements lying axially aligned with their concave surfaces opposed, the inner and outer surfaces of the meniscus elements being spherical and having substantially the same center of curvature, which lies at approximately the center of symmetry of the system, and a pair of inner collective elements between the meniscus elements and having outer spherical surfaces coincident with and cemented to the inner surfaces of the meniscus elements, the inner elements having spaced opposed inner surfaces at approximately the center of symmetry of the system, at least one of said opposed inner surfaces being aspheric, the asphericity being such as to correct for spherical aberration throughout substantially all zones of the aperture, the nodal points of the system lying approximately coincident and substantially at the center of symmetry of the system.

10. A refractive optical system comprising a pair of symmetrically arranged achromatic doublets, said doublets including substantially spherical light-transmissive surfaces having a common center of curvature located centrally with respect to the symmetrically arranged pair, and aspherical means passing substantially through said center of curvature and adapted to correct for spherical aberration.

11. A refractive optical system comprising a pair of symmetrically arranged identical doublets, said doublets including substantially spherical light-transmissive surface having a common center of curvature located centrally with respect to the symmetrically arranged pair, and aspherical means passing substantially through said center of curvature and adapted to correct for spherical aberration.

12. In a refractive optical system, a pair of oppositely facing elemental lens portions each of which includes a substantially spherical light-transmissive surface, said surface having a common center of curvature located centrally with repect to said oppositely facing portions, and aspherical correction means passing substantially through aid center of curvature and adapted to correct for spherical aberration.

13. An optical system adapted for operation at finite conjugates, comprising: a transparent refractive body having a substantially spherical light-refracting surface which produces spherical aberration of light transmitted therethrough, means providing an additional light-refracting surface passing through the center of curvature of said spherical surface and being configured to correct for the spherical aberration introduced by said spherical surface, and means spaced from said body and providing an object surface at one of the conjugate foci of said body and an image surface at the other of the conjugate foci thereof.

14. An optical system comprising: an achromatic doublet including substantially spherical light-refracting surfaces which produce spherical aberration of light transmitted therethrough and all of which spherical surfaces have a common center of curvature, said doublet having an additional light-refracting surface passing through the center of curvature of said spherical surfaces and configured to correct for the spherical aberration introduced by said spherical surface, and means spaced from said doublet and providing an object surface at one of the conjugate foci of said doublet and an image surface at the other of the conjugate foci thereof.

ALBERT BOUWERS.

REFERENCES CITED

The following references are of record in the file of this patent:

UNITED STATES PATENTS

| Number | Name | Date |
|---|---|---|
| 697,959 | Abbe | Apr. 22, 1902 |
| 706,650 | Goerz | Aug. 12, 1902 |
| 880,208 | Germain et al. | Feb. 25, 1908 |
| 934,579 | Straubel et al. | Sept. 21, 1909 |
| 1,507,212 | Silberstein | Sept. 2, 1924 |
| 2,031,792 | Richter | Feb. 25, 1936 |
| 2,100,290 | Lee | Nov. 23, 1937 |
| 2,100,291 | Lee | Nov. 23, 1937 |

FOREIGN PATENTS

| Number | Country | Date |
|---|---|---|
| 2,193 | Great Britain | of 1859 |